(12) United States Patent
Shimomura

(10) Patent No.: US 10,003,721 B2
(45) Date of Patent: Jun. 19, 2018

(54) IMAGE PROCESSING METHOD AND IMAGE PROCESSING DEVICE FOR GRAY OUTPUT SIGNAL

(71) Applicant: RISO KAGAKU CORPORATION, Tokyo (JP)

(72) Inventor: Kenji Shimomura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days. days.

(21) Appl. No.: 15/293,564

(22) Filed: Oct. 14, 2016

(65) Prior Publication Data

US 2017/0118381 A1 Apr. 27, 2017

(30) Foreign Application Priority Data

Oct. 22, 2015 (JP) ................................ 2015-208090

(51) Int. Cl.
*H04N 1/40* (2006.01)
*H04N 1/60* (2006.01)
*G06K 15/10* (2006.01)

(52) U.S. Cl.
CPC ......... *H04N 1/6022* (2013.01); *G06K 15/102* (2013.01); *H04N 1/40087* (2013.01); *H04N 1/6008* (2013.01); *H04N 1/6058* (2013.01); *G06K 2215/0094* (2013.01); *G06K 2215/101* (2013.01)

(58) Field of Classification Search
None
See application file for complete search history.

(56) References Cited

U.S. PATENT DOCUMENTS 4,812,899 A 3/1989 Kueppers
8,203,754 B2 6/2012 Yoshida
2015/0213342 A1 7/2015 Fukamachi et al.

FOREIGN PATENT DOCUMENTS

EP 0532302 3/1993
JP 2015-142238 8/2015

OTHER PUBLICATIONS

Extended European Search Report issued in European Patent Application No. 16194555.5, dated Feb. 21, 2017.

*Primary Examiner* — Barbara Reinier
(74) *Attorney, Agent, or Firm* — Greenblum & Bernstein, P.L.C.

(57) ABSTRACT

An image processing method comprising: converting an RGB input signal to a CMYK signal; converting the RGB input signal to a common color signal including lightness; generating a first Gray signal including a Gray value substituted for CMY values forming gray in the CMYK signal; generating a second Gray signal including a Gray value corresponding to a K value greater than a threshold in the CMYK signal; generating a Gray output signal in a CMYK-Gray output signal indicating color material amounts of cyan (C), magenta (M), yellow (Y), black (K), and gray (Gray) for printing by multiplying the generated first Gray signal and the generated second Gray signal respectively by coefficients corresponding to the lightness in the common color signal and then synthesizing the first Gray signal and the second Gray signal.

6 Claims, 4 Drawing Sheets

IMAGE PROCESSING METHOD AND IMAGE PROCESSING DEVICE FOR GRAY OUTPUT SIGNAL

CROSS REFERENCE TO RELATED APPLICATION

This application is based upon and claims the benefit of priority from the prior Japanese Patent Application No. 2015-208090, filed on Oct. 22, 2015, the entire contents of which are incorporated herein by reference.

BACKGROUND

1. Technical Field

The disclosure relates to an image processing method and an image processing device for a Gray output signal.

2. Related Art

An inkjet printer capable of color printing generally uses ink of four colors of cyan (C), magenta (M), yellow (Y), and black (K).

Meanwhile, there is known an inkjet printer further using a gray (Gray) ink to improve the color stability of gray and the density of dark portions in a printed image. In this inkjet printer, the color stability of gray and the density of dark portions can be improved by performing operations (1) and (2) described below.

(1) The CMY inks forming gray are replaced by a gray ink by using the concept of under color removal (UCR). Here, UCR is a publicly-known method of replacing the CMY inks with the K ink as disclosed in Japanese Unexamined Patent Application Publication No. 2015-142238 and the Specification of U.S. Pat. No. 4,812,899.

(2) The gray ink is added to pixels in each of which the K ink is ejected by an amount greater than a predetermined amount.

The operation (1) described above can prevent coloring of gray due to errors in ejection amounts and deviation of landing positions of the CMY inks. Hence, the color stability of gray is improved.

The operation (2) described above can improve the density of dark portions by causing the gray ink to be ejected in addition to the K ink.

SUMMARY

Meanwhile, when the operations (1) and (2) are simply combined to improve the color stability of gray and the density of dark portions, the gray ink is sometimes redundantly applied to, for example, a low lightness region to be printed with all of the CMYK inks ejected, and the gray ink amount becomes excessive. This may result in formation of a region printed in a density higher than necessarily and thereby decrease the printing quality.

An object of the disclosure is to provide an image processing method and an image processing device which can improve the color stability of gray and the density of dark portions while suppressing a decrease in the printing quality.

An image processing method in accordance with some embodiments includes: converting an RGB input signal to a CMYK signal; converting the RGB input signal to a common color signal including lightness; generating a first Gray signal including a Gray value substituted for CMY values forming gray in the CMYK signal; generating a second Gray signal including a Gray value corresponding to a K value greater than a threshold in the CMYK signal; generating a Gray output signal in a CMYKGray output signal indicating color material amounts of cyan (C), magenta (M), yellow (Y), black (K), and gray (Gray) for printing by multiplying the generated first Gray signal and the generated second Gray signal respectively by coefficients corresponding to the lightness in the common color signal and then synthesizing the first Gray signal and the second Gray signal.

An image processing device in accordance with some embodiments includes: a processor; and a memory including instructions that, when executed by the processor, cause the processor to perform operations. The operations include: converting an RGB input signal to a CMYK signal; converting the RGB input signal to a common color signal including lightness; generating a first Gray signal including a Gray value substituted for CMY values forming gray in the CMYK signal; generating a second Gray signal including a Gray value corresponding to a K value greater than a threshold in the CMYK signal; generating a Gray output signal in a CMYKGray output signal indicating color material amounts of cyan (C), magenta (M), yellow (Y), black (K), and gray (Gray) for printing by multiplying the generated first Gray signal and the generated second Gray signal respectively by coefficients corresponding to the lightness in the common color signal and then synthesizing the first Gray signal and the second Gray signal.

In the image processing method and the image processing device described above, the Gray output signal in the CMYKGray output signal is generated by multiplying the first Gray signal and the second Gray signal respectively by the coefficients corresponding to the lightness in the common color signal and then synthesizing the first Gray signal and the second Gray signal. The Gray output signal can be thereby generated by synthesizing the first Gray signal and the second. Gray signal such that excess of a color material amount of gray is suppressed and the color stability of gray and the density of dark portions are improved. As a result, it is possible to suppress a decrease in printing quality and also improve the color stability of gray and the density of dark portions.

DETAILED DESCRIPTION

Figure 1:
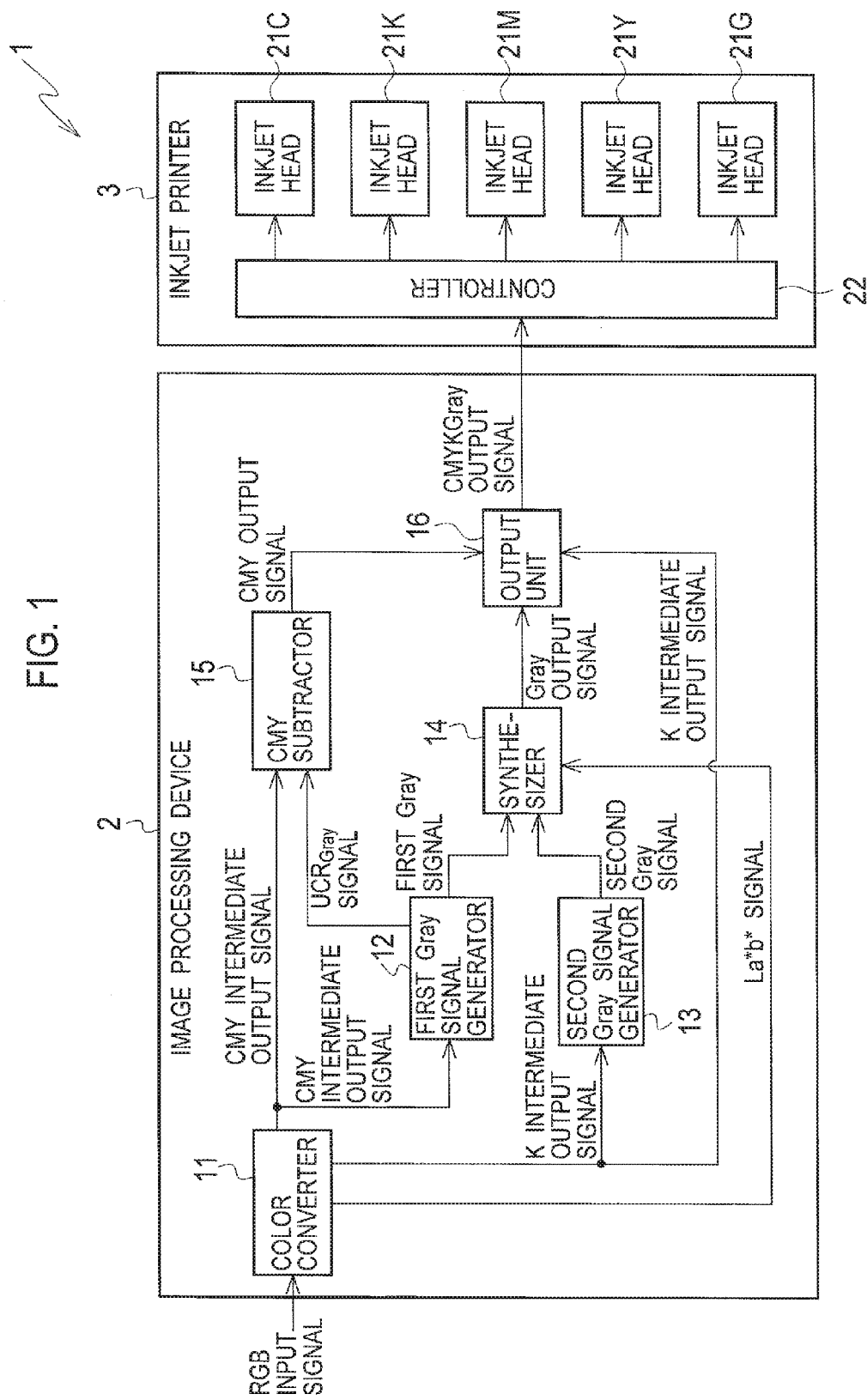
FIG. 1 is a block diagram illustrating a configuration of a printing system including an image processing device in an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

An embodiment of the present invention is described below with reference to the drawings.

FIG. 1 is a block diagram illustrating a configuration of a printing system 1 including an image processing device 2 in an embodiment of the present invention.

As illustrated in FIG. 1, the printing system 1 of the embodiment includes the image processing device 2 and an inkjet printer 3.

The image processing device 2 converts an RGB input signal to a CMYKGray output signal and outputs the CMYKGray output signal to the inkjet printer 3. The CMYKGray output signal is a signal indicating ink amounts (color material amounts) of cyan (C), magenta (M), yellow (Y), black (K), and gray (Gray) in each pixel for printing by the inkjet printer 3.

The image processing device 2 includes a color convertor 11, a first Gray signal generator 12, a second Gray signal generator 13, a synthesizer 14, a CMY subtractor 15, and an output unit 16. Note that the units of the image processing device 2 can be implemented by software or hardware by using a CPU, a RAM, a ROM (storage including a semiconductor memory and the like), a hard disk drive, an external interface, and the like. The storage stores instructions which cause a processor such as the CPU to perform processing to be described later when executed by the processor.

The color convertor 11 converts the RGB input signal to a CMYK signal. The conversion from the RGB input signal to the CMYK signal can be performed by using a table in which correspondences between RGB values and CMYK values are recorded in advance. The color convertor 11 outputs a CMY intermediate output signal to the first Gray signal generator 12 and the CMY subtractor 15. The CMY intermediate output signal is a signal of three colors of CMY in the CMYK signal. Moreover, the color convertor 11 outputs a K intermediate output signal to the second Gray signal generator 13 and the output unit 16. The K intermediate output signal is a signal of K in the CMYK signal.

The color convertor 11 also converts the RGB input signal to a La*b* signal which is a common color signal. The conversion from the RGB input signal to the La*b* signal can be performed by using a table in which correspondences between the RGB values and La*b* values in a La*b* color system are recorded in advance. The color convertor 11 outputs the La*b* signal to the synthesizer 14.

The first Gray signal generator 12 generates a first Gray signal based on the CMY intermediate output signal. The first Gray signal is a signal obtained by substituting a Gray value for CMY values forming gray in the CMYK signal DY using the concept of UCR. The first Gray signal is a signal for improving color stability of gray.

The second Gray signal generator 13 generates a second Gray signal based on the K intermediate output signal. The second Gray signal is a signal including a Gray value corresponding to a K value greater than a threshold Kth in the CMYK signal. The second Gray signal is a signal for improving the density of dark portions.

The synthesizer 14 generates a Gray output signal in the CMYKGray output signal by multiplying the first Gray signal and the second Gray signal respectively by coefficients corresponding to lightness L in the La*b* signal and then synthesizing the obtained signals.

The CMY subtractor 15 generates a CMY output signal in the CMYKGray output signal by subtracting CMY values corresponding to an $UCR_{Gray}$ value to be described later from the CMY values in the CMY intermediate output signal.

The output unit 16 integrates the CMY output signal, the K intermediate output signal, and the Gray output signal to generate the CMYKGray output signal, and outputs the CMYKGray output signal to the inkjet printer 3.

The inkjet printer 3 prints an image on a sheet, based on the CMYKGray output signal outputted by the image processing device 2. The inkjet printer 3 includes inkjet heads 21C, 21K, 21M, 21Y, and 21G and a controller 22.

The inkjet heads 21C, 21K, 21M, 21Y, and 21G print an image on a sheet by electing inks of cyan, magenta, yellow, black, and gray, respectively, onto the sheet.

The controller 22 drives and controls the inkjet heads 21C, 21K, 21M, 21Y, and 21G, based on the CMYKGray output signal outputted by the image processing device 2 to cause the inkjet heads 21C, 21K, 21M, 21Y, and 21G to eject the inks.

Next, operations of the image processing device 2 are described.

Figure 2:
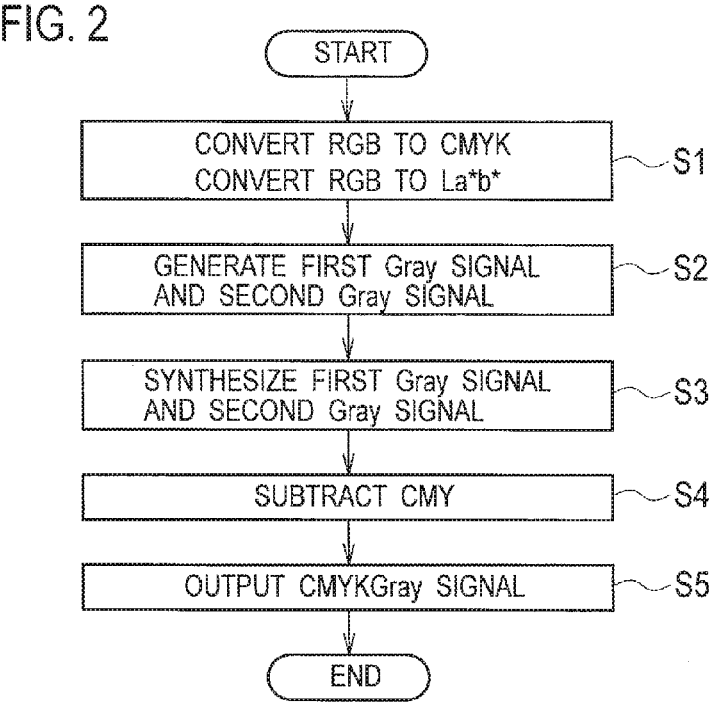
FIG. 2 is a flowchart for explaining operations of the image processing device.

FIG. 2 is a flowchart for explaining the operations of the image processing device 2. Processing of the flowchart of FIG. 2 starts when the RGB, input signal is inputted into the image processing device 2. The RGB input signal is a signal including the RGB values of each pixel in an image to be printed. The RGB input signal is inputted from, for example, a scanner which reads an original image.

In step S1 of FIG. 2, the color convertor 11 converts the RGB input signal to the CMYK signal. Then, the color convertor 11 outputs the CMY intermediate output signal to the first Gray signal generator 12 and the CMY subtractor 15, and outputs the K intermediate output signal to the second Gray signal generator 13 and the output unit 16. Moreover, the color convertor 11 converts the RGB input signal to the La*b* signal and outputs the La*b* signal to the synthesizer 14.

Next, in step S2, the first Gray signal generator 12 generates the first Gray signal based on the CMY intermediate output signal. Specifically, the first Gray signal generator 12 firstly calculates an $UCR_{Gray}$ value by using the following formula (1). The first Gray signal generator 12 outputs an $UCR_{Gray}$ signal including the $UCR_{Gray}$ value to the CMY subtractor 15. Subsequently, the first Gray signal generator 12 calculates Gray1 which is a Gray value of the first Gray signal, from the $UCR_{Gray}$ value by using the formula (2). Then, the first Gray signal generator 12 outputs the first Gray signal to the synthesizer 14.

$$UCR_{Gray}=\min(C, M, Y) \quad (1)$$

$$Gray1=\chi \times (\alpha+\beta+\delta) \times UCR_{Gray} \quad (2)$$

In this case, $\alpha$, $\beta$, and $\delta$ in the formula (2) are coefficients used in calculation of the following formulae (3) to (5) performed by the CMY subtractor 15 in step S4 to be described later. This calculation is calculation for subtracting the ink amounts of cyan, magenta, and yellow forming gray respectively from the original ink amounts thereof.

$$C' = C - \alpha \times UCR_{Gray} \quad (3)$$

$$M' = M - \beta \times UCR_{Gray} \quad (4)$$

$$Y' = Y - \delta \times UCR_{Gray} \quad (5)$$

α, β, and δ in the formulae (2) to (5) are coefficients for equalizing a gray ink amount and the total of the subtracted ink amounts of cyan, magenta, and yellow in the substitution of the Gray value for the CMY values forming the gray by using the concept of UCR and for matching the shade of color after the substitution to that before the substitution. α, β, and δ are each a value of 1 or smaller. The values of α, β, and δ are set in advance based on experiments.

Moreover, χ in the formula (2) is a coefficient for adjusting the gray ink amount depending on the type of the sheet and the type of the gray ink such that the density of gray after the substitution becomes equal to that before the substitution. Since the density of gray after the substitution cannot always be adjusted to be equal to the density of gray before the substitution only by using α, β, and δ depending on the type of the sheet and the type of the gray ink, the adjustment is performed by using χ in the formula (2). The value of χ is set in advance based on experiments.

Moreover, in step S2, the second. Gray signal generator 13 generates the second Gray signal based on the K intermediate output signal. Specifically, the second Gray signal generator calculates Gray2 which is a Gray value of the second Gray signal, from a K value greater than the threshold Kth the intermediate output signal by using the following formula (6). Then, the second Gray signal generator 13 outputs the second. Gray signal to the synthesizer 14.

$$Gray2 = \eta \times K (K > Kth) \quad (6)$$

In this case, the value of the coefficient η in the formula (6) is set in advance based on experiments to a value optimal from a view point of density in the printed image.

Next, in step S3, the synthesizer 14 generates the Gray output signal by multiplying the first Gray signal and the second Gray signal respectively by the coefficients corresponding to the lightness L and then synthesizing the obtained signals. Specifically, the synthesizer 14 calculates a Gray value of the Gray output signal by using the formula (9) and coefficients $f(L)_{Gray1}$ and $f(L)_{Gray2}$ expressed by functions corresponding to the lightness L as shown in the following formulae (7) and (8). Then, the synthesizer 14 outputs the Gray output signal to the CMY subtractor 15 and the output unit 16.

(Math 1)

$$f(L)_{Gray1} = \begin{cases} 1 - \dfrac{1}{\exp(\theta \times (L - Lth)) + 1} & (Gray1 = 0) \\ 1 & (Gray1 \neq 0) \end{cases} \quad (7)$$

$$f(L)_{Gray2} = \dfrac{1}{\exp(\theta \times (L - Lth)) + 1} \quad (8)$$

$$Gray = f(L)_{Gray1} \times Gray1 + f(L)_{Gray2} \times Gray2 \quad (9)$$

In this case, the threshold Lth in the formulae (7) and (8) is a value of the lightness at which Gray2 abruptly changes in distribution of Gray 2 as in, for example, FIG. 5 to be described later, and is a value set as the value of the lightness at which the gray ink amount obtained by directly adding up Gray1 and Gray2 is the greatest.

Figure 3:
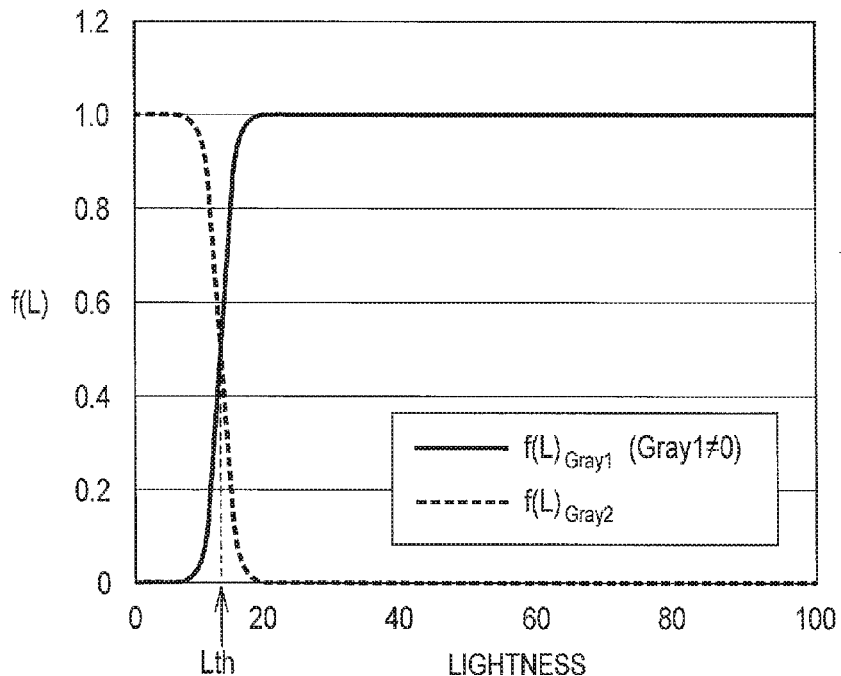
FIG. 3 is a graph explaining a coefficient by which a first Gray signal is multiplied and a coefficient by which a second Gray signal is multiplied.

As depicted in FIG. 3, $f(L)_{Gray1}$ (Gray1≠0) and $f(L)_{Gray2}$ have shapes similar to step functions. Specifically, $f(L)_{Gray1}$ (Gray1≠0) is a function which takes a value close to 0 in a low lightness range and takes a value close to 1 in a high lightness range and which gradually changes from the value close to 0 to the value close to 1 around the threshold Lth. Meanwhile, $f(L)_{Gray2}$ is a function which takes a value close to 1 in a low lightness range and takes a value close to 0 in a high lightness range and which gradually changes from the value close to 1 to the value close to 0 around the threshold Lth. In a range of lightness lower than the threshold Lth, $f(L)_{Gray2}$ is greater than $f(L)_{Gray1}$ (Gray1≠0). Meanwhile, in a range of lightness higher than the threshold Lth, $f(L)_{Gray1}$ (Gray1≠0) is greater than $f(L)_{Gray2}$.

θ in the formulae (7) and (8) is a parameter specifying changing rates of the values of $f(L)_{Gray1}$ and $f(L)_{Gray2}$. The value of θ is set in advance based on experiments.

Next, in step S4, the CMY subtractor 15 subtracts the CMY values corresponding to the $UCR_{Gray}$ value from the CMY values in the CMY intermediate output signal. Specifically, the CMY subtractor 15 calculates C', M', and Y' to be the CMY values in the CMYKGray output signal by using the aforementioned formulae (3) to (5). Then, the CMY subtractor 15 outputs the CMY output signal including the values of C', M', and Y' to the output unit 16.

Next, in step S5, the output unit 16 integrates the CMY output signal, the K intermediate output signal, and the Gray output signal to generate the CMYKGray output signal, and outputs the CMYKGray output signal to the inkjet printer 3. The operations of the image processing device 2 are thereby completed.

Ink amounts $Ink_{5C}$ of the colors in the CMYKGray output signal generated by the aforementioned operations of the image processing device 2 are expressed as in the following formula (10).

(Math 2)

$$Ink_{5C} = (C - \alpha \times UCR_{Gray}, M - \beta \times UCR_{Gray}, Y - \delta \times UCR_{Gray}, K, Gray) \quad (10)$$

C, M, Y, and K in the formula (10) are signal values of the respective colors in the CMYK signal converted by the color convertor 11 from the RGB input signal. $UCR_{Gray}$ in the formula (10) is a value calculated by using the formula (1). Gray in the formula (10) is a value calculated by using the formula (9).

When the CMYKGray output signal outputted by the image processing device 2 is inputted into the inkjet printer 3, the controller 22 drives and controls the inkjet heads 21C, 21K, 21M, 21Y, and 21G based on the CMYKGray output signal to cause the inkjet heads 21C, 21K, 21M, 21Y, and 21G to eject the inks onto a sheet. An image is thereby printed on the sheet.

Next, description is given of specific examples of the ink amounts of the respective colors which are calculated by the aforementioned operations of the image processing device 2.

Figure 4:
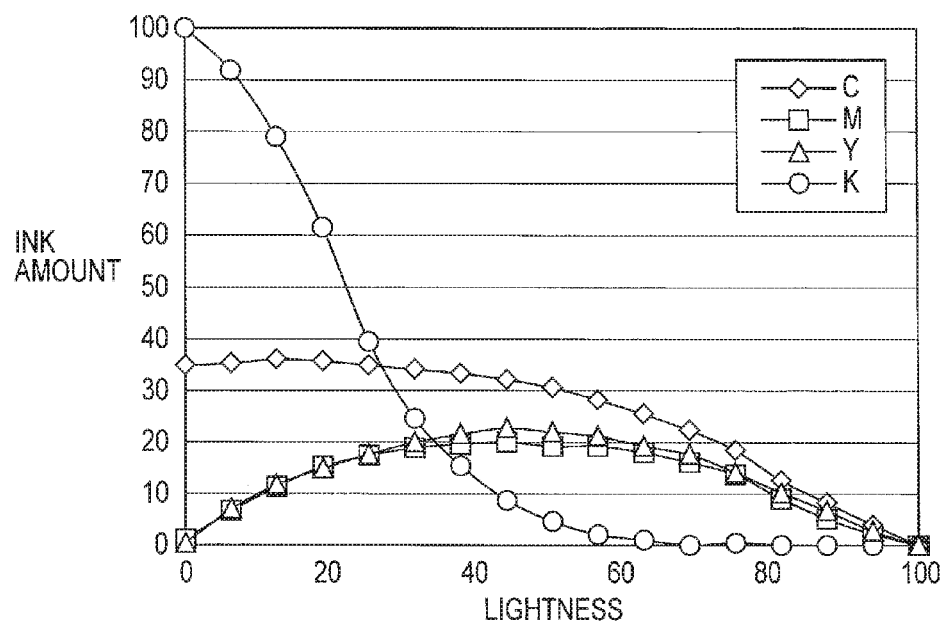
FIG. 4 is a graph depicting an example of ink amounts of respective colors in a CMYK signal converted from an RGB input signal.

FIG. 4 is a graph depicting an example of signal values (ink amounts) of the respective colors in the CMYK signal converted from the RGB input signal. The example of FIG. 4 depicts the signal values on a gray axis of (a*b*)=(0, 0).

Figure 5:
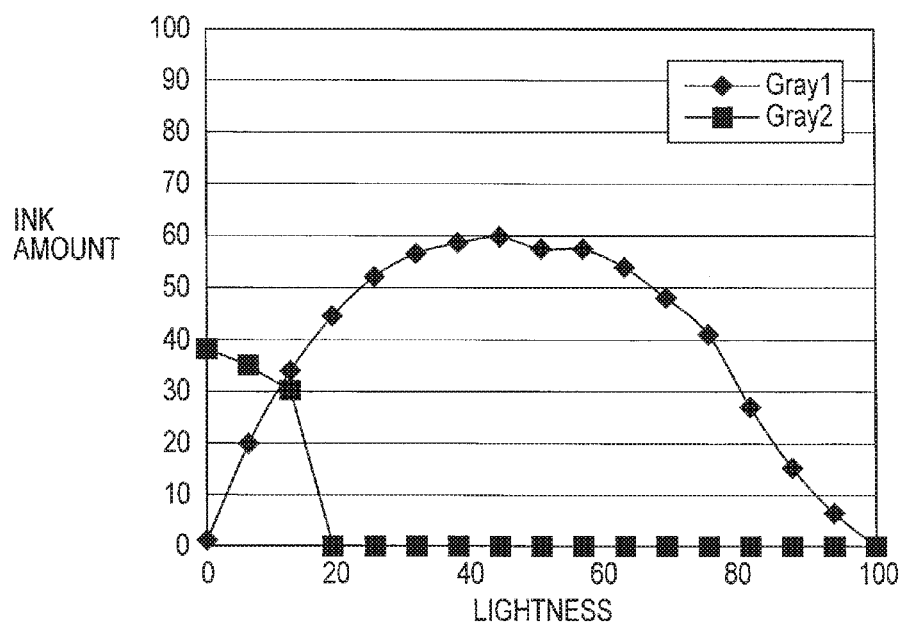
FIG. 5 is a graph depicting ink amounts in the first Gray signal and the second Gray signal corresponding to the CMYK signal in FIG. 4.
Figure 6:
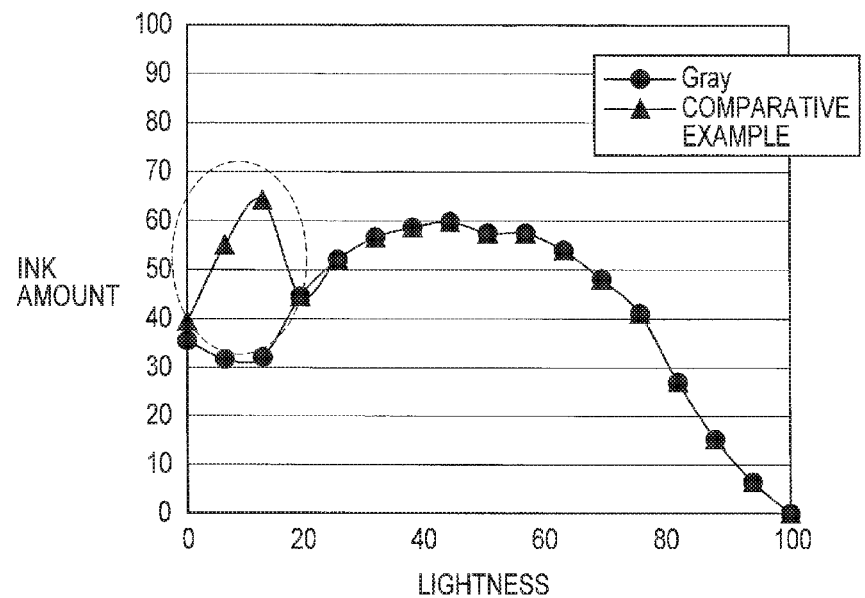
FIG. 6 is a graph depicting an ink amount in a Gray output signal corresponding to the first Gray signal and the second Gray signal in FIG. 5.

Gray1 (first gray signal) calculated by using the formulae (1) and (2) and Gray2 (second Gray signal) calculated by using the formula (6) which correspond to the example of FIG. 4 are as illustrated in FIG. 5. Moreover, Gray (Gray output signal) calculated by using the formula (9) which corresponds to Gray1 and Gray2 of FIG. 5 is as illustrated in FIG. 6. In this case, FIG. 6 also depicts values of gray ink amounts obtained by simply adding up Gray1 and Gray2 of FIG. 5 as a comparative example.

In the comparative example, since Gray1 and Gray2 are simply added up, the gray ink amount is excessive in a low lightness range as in a portion surrounded by a broken line in FIG. 6. Hence, there is a possibility that a region printed in a density higher than necessary is formed and the printing quality decreases. Meanwhile, Gray in FIG. 6 calculated in the embodiment is such that Gray1 and Gray2 in FIG. 5 are smoothly connected to each other, and excess of the gray ink amount is suppressed in the low lightness region.

Figure 7:
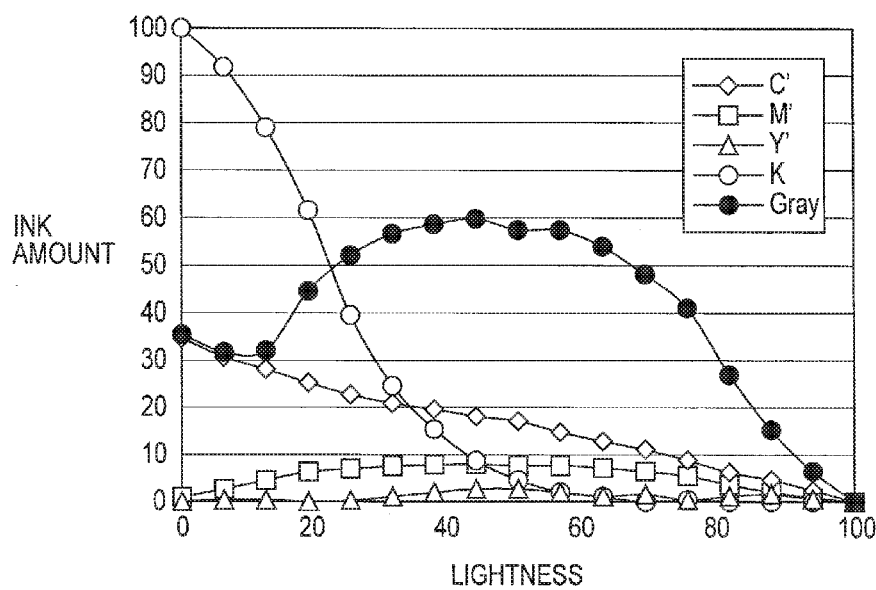
FIG. 7 is a graph depicting ink amounts of the respective colors in a CMYKGray output signal corresponding to the CMYK signal in FIG. 4.

The signal values (ink amounts) of the respective colors in the CMYKGray output signal corresponding to the example of FIG. 4 which include Gray depicted in FIG. 6 are as depicted in FIG. 7. C', M', and Y' in FIG. 7 are calculated by using the formulae (3) to (5).

As described above, in the image processing device 2, the first Gray signal generator 12 generates the first Gray signal which includes the Gray value substituted for the CMY values forming gray in the CMYK signal by using the concept of UCR. Since the first Gray signal can prevent coloring of gray due to errors in ejection amounts and landing deviation of the CMY inks, the color stability of gray is improved.

Moreover, in the image processing device 2 the second Gray signal generator 13 generates the second Gray signal including the Gray value corresponding to the K value greater than the threshold Kth in the CMYK signal. The second Gray signal can improve the density of dark portions by causing the gray ink to be ejected in addition to the K ink.

Then, the synthesizer 14 generates the Gray output signal by multiplying the first Gray signal and the second Gray signal respectively by the coefficients $f(L)_{Gray1}$ and $f(L)_{Gray2}$ corresponding to the lightness and then synthesizing the obtained signals. The image processing device 2 can thereby generate the Gray output signal by synthesizing the first Gray signal and the second Gray signal such that excess of the Gray ink amount is suppressed and the color stability of gray and the density of dark portions are improved. As a result, it is possible to suppress a decrease of the printing quality in the inkjet printer 3 while improving the color stability of gray and the density of dark portions.

Note that the coefficients by which the first Gray signal and the second Gray signal are multiplied in the synchronization thereof are not limited to those expressed in the formulae (7) and (8). The first Gray signal and the second Gray signal may be multiplied by coefficients expressed by functions depending on chroma in addition to the lightness and then synthesized with each other.

Moreover, it is possible to form in advance a table of relationships between the RGB values and the CMYKGray values corresponding thereto which are obtained by calculation similar to the aforementioned calculation in the image processing device 2, and generate the CMYKGray output signal from the RGB input signal by using the formed table. In this case, it is possible to store only the representative RGB values and the CMYKGray values corresponding thereto in the table and calculate other values by interpolation calculation.

Moreover, although the image processing in the aforementioned embodiment is described as the image processing for performing printing in the inkjet printer, the image processing may be image processing for performing printing in a printing device using color materials other than inks.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image processing method, comprising:
   receiving an RGB input signal by an image processing device;
   converting the RGB input signal to a CMYK signal;
   converting the RGB input signal to a common color signal including lightness;
   generating a first Gray signal including a Gray value substituted for CMY values forming gray in the CMYK signal;
   generating a second Gray signal including a Gray value corresponding to a K value greater than a threshold in the CMYK signal;
   generating a Gray output signal in a CMYKGray output signal indicating color material amounts of cyan (C), magenta (M), yellow (Y), black (K), and gray (Gray) for printing by multiplying the generated first Gray signal and the generated second Gray signal respectively by coefficients corresponding to the lightness in the common color signal and then synthesizing the first Gray signal and the second Gray signal; and
   outputting the CMYKGray output signal from the image processing device for printing,
   wherein a printer prints an image based on the CMYKGray output signal.

2. The image processing method according to claim 1, wherein the Gray output signal ($S_{Gray}$) is generated by evaluating the expression $$S_{Gray} = f(L)_{Gray1} \times S_{Gray1} + f(L)_{Gray2} \times S_{Gray2},$$

$$f(L)_{Gray1} = \begin{cases} 1 - \dfrac{1}{\exp(\theta \times (L - Lth)) + 1} & (S_{Gray1} = 0) \\ 1 & (S_{Gray1} \neq 0) \end{cases}$$

$$f(L)_{Gray2} = \dfrac{1}{\exp(\theta \times (L - Lth)) + 1}$$

wherein $S_{Gray1}$ is the first Gray signal, $S_{Gray2}$ is the second gray signal, L is the lightness in the common color signal, Lth is a predetermined threshold value of the lightness, and θ is a parameter having a predetermined value.

3. The image processing method according to claim 2, wherein Lth is a value of the lightness at which $S_{Gray2}$ abruptly changes in distribution of $S_{Gray2}$.

4. An image processing device, comprising:
   a processor; and
   a memory including instructions that, when executed by the processor, cause the processor to perform operations including
   receiving an RGB input signal by the image processing device, converting the RGB input signal to a CMYK signal, converting the RGB input signal to a common color signal including lightness, generating a first Gray signal including a Gray value substituted for CMY values forming gray in the CMYK signal, generating a second Gray signal including a Gray value corresponding to a K value greater than a threshold in the CMYK signal, generating a Gray output signal in a CMYKGray output signal indicating color material amounts of cyan (C), magenta (M), yellow (Y), black (K), and gray (Gray) for printing by multiplying the generated first Gray signal and the generated second Gray signal respectively by coefficients corresponding to the lightness in the common color signal and then synthesizing the first Gray signal and the second Gray signal; and outputting the CMYKGray output signal from the image processing device to a printer, wherein the printer prints an image based on the CMYKGray output signal.

5. The image processing device according to claim 4, wherein the Gray output signal ($S_{Gray}$) is generated by evaluating the expression $$S_{Gray} = f(L)_{Gray1} \times S_{Gray1} + f(L)_{Gray2} \times S_{Gray2},$$

$$f(L)_{Gray1} = \begin{cases} 1 - \dfrac{1}{\exp(\theta \times (L - Lth)) + 1} & (S_{Gray1} = 0) \\ 1 & (S_{Gray1} \neq 0) \end{cases}$$

$$f(L)_{Gray2} = \dfrac{1}{\exp(\theta \times (L - Lth)) + 1}$$

wherein $S_{Gray1}$ is the first Gray signal, $S_{Gray2}$ is the second gray signal, L is the lightness in the common color signal, Lth is a predetermined threshold value of the lightness, and $\theta$ is a parameter having a predetermined value.

6. The image processing device according to claim 5, wherein Lth is a value of the lightness at which $S_{Gray2}$ abruptly changes in distribution of $S_{Gray2}$.

* * * * *